United States Patent
Royyuru et al.

(10) Patent No.: US 10,504,090 B2
(45) Date of Patent: Dec. 10, 2019

(54) MOBILE DEVICE CONTACTLESS PAYMENTS

(71) Applicant: First Data Corporation, Greenwood Village, CO (US)

(72) Inventors: Vijay K. Royyuru, Wilmington, DE (US); Robert P. Klotz, Wilmington, DE (US); Christopher T. Cox, Atlanta, GA (US); Kelly B. Urban, Omaha, NE (US); Sridher Swaminathan, Omaha, NE (US)

(73) Assignee: First Data Corporation, Greenwood Village, CO (US)

( * ) Notice: Subject to any disclaimer, the term of this patent is extended or adjusted under 35 U.S.C. 154(b) by 842 days.

(21) Appl. No.: 14/960,108

(22) Filed: Dec. 4, 2015

(65) Prior Publication Data
US 2016/0162862 A1     Jun. 9, 2016

Related U.S. Application Data

(60) Provisional application No. 62/088,410, filed on Dec. 5, 2014.

(51) Int. Cl.
| | | |
|---|---|---|
| *G06G 1/12* | (2006.01) | |
| *G06Q 20/00* | (2012.01) | |
| *G06Q 20/20* | (2012.01) | |
| *G06Q 20/32* | (2012.01) | |
| *G06Q 20/40* | (2012.01) | |
| *G06Q 20/34* | (2012.01) | |

(52) U.S. Cl.
CPC ........... *G06Q 20/202* (2013.01); *G06Q 20/20* (2013.01); *G06Q 20/3226* (2013.01); *G06Q 20/3278* (2013.01); *G06Q 20/352* (2013.01); *G06Q 20/3572* (2013.01); *G06Q 20/3574* (2013.01); *G06Q 20/405* (2013.01)

(58) Field of Classification Search
None
See application file for complete search history.

(56) References Cited

U.S. PATENT DOCUMENTS

| | | | |
|---|---|---|---|
| 8,523,053 B2 | 9/2013 | Royyuru et al. | |
| 8,636,206 B2 | 1/2014 | Rothwell et al. | |
| 2005/0192895 A1 | 9/2005 | Rogers et al. | |
| 2010/0185545 A1 | 7/2010 | Royyuru et al. | |
| 2015/0339664 A1* | 11/2015 | Wong | H04L 9/3234 705/71 |
| 2016/0092871 A1* | 3/2016 | Gordon | H04L 63/0414 705/44 |
| 2016/0092872 A1* | 3/2016 | Prakash | G06Q 20/3829 705/65 |

* cited by examiner

*Primary Examiner* — Ariel J Yu
(74) *Attorney, Agent, or Firm* — Kilpatrick Townsend & Stockton LLP

(57) ABSTRACT

Devices and systems for performing contactless payments. The devices are configured such that account issuers have increased flexibility, and such that the systems and methods are extensible to encompass new technologies.

9 Claims, 13 Drawing Sheets

Schematic Overview

BIGSTORE MOBILE PAYMENT SETUP

Please indicate what additional data you would like to send us when you make a purchase:

 Your BigStore loyalty number
(Enter Number Here)

(This lets us record your loyalty points automatically with each purchase.)

 Your email address
(Enter Address Here)

(This tells us where to send electronic receipts.)

 Your location (This helps us ensure your transaction is not fradulent.)

You can turn off or update this information at any time.

CANCEL     SAVE

FIG. 4

Tag # 1: Track 1 Data
XXXX XXXX XXXX XXXX XXXX XXXX XXXX XXXX

Tag #2: Track 2 Data
XXXX XXXX XXXX XXXX XXXX XXXX XXXX

Tag #3: Transaction amount
$123.45

Tag #4: Merchant name
BigStore

Tag #5: Merchant address
.
.
.

Tag #23: Customer loyalty number
XXXXXXXXXXXX

Tag #24: POS GPS location
XXXXX XXXXX

FIG. 5A

Sample NFC P2P (ISO 18092) XML

```
<n:p6E>
  <n:p50>FirstData</n:p50>
  <n:pE4>0100</n:pE4>
  <n:p56>B5555551155329667^DATA/1ST^17111810692416896006 7</n:p56>
  <n:p57>5555551155329667D17111810692416896006 7</n:p57>
  <n:pE5>
    <n:pEC>
      <n:pEA>D1A1</n:pEA>
      <n:pEB>33.9029588, -84.3574943</n:pEB>
    </n:pEC>
  </n:pE5>
  <n:pE6>
    <n:pEC>
      <n:pEA>B1A1</n:pEA>
      <n:pEB>ABCDEFGHIJ</n:pEB>
    </n:pEC>
    <n:pEC>
      <n:pEA>B2A1</n:pEA>
      <n:pEB>0123456789012345 6</n:pEB>
    </n:pEC>
    <n:pEC>
      <n:pEA>B3A1</n:pEA>
      <n:pEB>8005551212</n:pEB>
    </n:pEC>
  </n:pE6>
  <n:pE7>
    <n:pEC>
      <n:pEA>A1A1</n:pEA>
      <n:pEB>abcdef1234</n:pEB>
    </n:pEC>
  </n:pE7>
</n:p6E>
```

TAG MEANINGS

Application Label
Version Number
Track 1
Track 2

During Payment VAS Data
VAS Data Set
VAS ID
VAS Data

Before Payment VAS Data

After Payment VAS Data

FIG. 5B

| Sample QR Token | TAG MEANINGS |
|---|---|
| `<n:Q6E>`<br>    `<n:Q50>FirstData</n:Q50>`<br>    `<n:QE4>0100</n:QE4>`<br>    `<n:Q57>5555551155329667D1711181069241686960067</n:Q57>`<br><br>    `<n:QE6>`<br>        `<n:QEC>`<br>            `<n:QEA>B3A1</n:QEA>`<br>            `<n:QEB>8005551212</n:QEB>`<br>        `</n:QEC>`<br>    `</n:QE6>`<br>`</n:Q6E>` | Application Label<br>Version Number<br>Track 2<br><br>Before Payment VAS Data<br>VAS Data Set<br>VAS ID<br>VAS Data |

EXAMPLE TRACK 1 LAYOUT FOR DEVICE WITH SECURE ELEMENT

| Field | Length | Description |
|---|---|---|
| Format Code | 1 | "B" |
| Device PAN | 16 | Device PAN issued by TSP |
| Delimiter | 1 | "^" |
| Name-Field | 8 | Constant value, set during personalization |
| Delimiter | 1 | "^" |
| Expiration date | 4 | YYMM, set by TSP during personalization |
| Service Code | 3 | Constant value "151" for no mPIN, "161" for mPIN usage |
| Data Format | 1 | Contains 0. Reserved for future use. |
| Unpredictable Number (UN) | 4 | Provided by the Reader |
| Dynamic Transaction Cryptogram (DTC) | 6 | Computed by SE applet using Device Unique Key (DUK) |
| Automated Transaction Counter (ATC) | 4 | Counter incremented within SE Applet, reset upon change of Expiration Date TSP lifecycle event |
| Discretionary data | 27 | Issuer discretionary data |
| Total | 76 | |

- DUK provisioned to SE Applet
- DUK derived by TSP/TSM from Issuer Master Key (IMK) using Device PAN, Expiration Date, Service Code
- IMK unique to Device PAN BIN and Expiration Date
- DTC computed by SE Applet using DUK, Device PAN, Expiration Date, Service Code, UN, ATC, mPIN if used – with TDES CBC-MAC, decimalization, truncation
- Issuer Processor validates DTC by having IMK, mPIN and reading Track data

FIG. 8

EXAMPLE TRACK 2 LAYOUT FOR DEVICE WITH SECURE ELEMENT

| Field | Length | Description |
|---|---|---|
| Device PAN | 16 | Device PAN issued by TSP |
| Delimiter | 1 | "=" |
| Expiration date | 4 | YYMM, set by TSP during personalization |
| Service Code | 3 | Constant value "151" for no mPIN, "161" for mPIN usage |
| Unpredictable Number | 4 | Provided by the Reader |
| Dynamic Transaction Cryptogram (DTC) | 6 | Computed by SE Applet |
| Automated Transaction Counter (ATC) | 4 | Counter incremented within SE Applet, reset upon change of Expiration Date TSP lifecycle event |
| Total | 38 | |

FIG. 9

EXAMPLE TRACK 1 LAYOUT FOR DEVICE USING HOST CARD EMULATION

| Field | Length | Description |
| --- | --- | --- |
| Format Code | 1 | "B" |
| Device PAN | 16 | Device PAN issued by TSP |
| Delimiter | 1 | "^" |
| Name-Field | 8 | Constant value, set by TSP |
| Delimiter | 1 | "^" |
| Expiration date | 4 | YYMM , set by TSP, resets LDK Sequence ID |
| Service Code | 3 | Constant value "171" for no mPIN, "181" for mPIN usage |
| Data Format | 1 | Contains 0. Reserved for future use. |
| Unpredictable Number | 4 | Provided by the Reader |
| Dynamic Transaction Cryptogram (DTC) | 6 | Computed by HCE SDK in app, using Limited Device Key (LDK) |
| LDK Sequence ID | 3 | Incremented by HCE server with each LDK |
| Automated Transaction Counter (ATC) | 1 | Counter incremented within HCE SDK for each transaction, reset with new LDK |
| Discretionary data | 27 | Issuer discretionary data |
| Total | 76 | |

- LDK generated uniquely by HCE host, then shared with Issuer Processor/DTC Validator
- LDK Sequence ID reset with change in Expiration Date, as TSP lifecycle event
- LDK, LDK Sequence ID provisioned to HCE SDK in app
- LDK usage limited by ATC, time rules at HCE SDK and Iss. Proc.
- DTC computed by HCE SDK in app, using LDK, Device PAN, Expiration Date, Service Code, UN, LDK Sequence ID, ATC, mPIN if used - with TDES CBC-MAC, decimalization, truncation
- Issuer Processor validates DTC by having LDK, LDK Sequence ID, mPIN and reading Track data

FIG. 10

EXAMPLE TRACK 2 LAYOUT FOR DEVICE USING HOST CARD EMULATION

| Field | Length | Description |
|---|---|---|
| Device PAN | 16 | Device PAN issued by TSP |
| Delimiter | 1 | "=" |
| Expiration date | 4 | YYMM , set by TSP |
| Service Code | 3 | Constant value "171" for no mPIN, "181" for mPIN usage |
| Unpredictable Number | 4 | Provided by the Reader |
| Dynamic Transaction Cryptogram (DTC) | 6 | Computed by HCE SDK in app, using Limited Device Key (LDK) |
| LDK Sequence ID | 3 | Incremented by HCE server with each LDK |
| Automated Transaction Counter (ATC) | 1 | Counter incremented within HCE SDK for each transaction, reset with new LDK |
| Total | 38 | |

MOBILE DEVICE CONTACTLESS PAYMENTS

CROSS-REFERENCE TO RELATED APPLICATION

This application claims the benefit of Provisional U.S. Patent Application No. 62/088,410, filed Dec. 5, 2014, and titled "Mobile Device Contactless Payments," the entire disclosure of which is hereby incorporated by reference herein for all purposes.

BACKGROUND OF THE INVENTION

The use of portable electronic devices such as smart cellular telephones as payment devices is increasing in popularity. There is a need for improved devices and methods that provide increased flexibility and extensibility as compared with prior systems.

BRIEF SUMMARY OF THE INVENTION

According to one aspect, a point of sale (POS) terminal comprises a reader having at least two interfaces for reading data from payment devices. The at least two interfaces include interfaces of at least two types. The POS terminal further comprises a POS terminal processor and a POS terminal memory holding instructions for execution by the POS terminal processor. The instructions, when executed by POS terminal processor, cause the POS terminal to receive first transaction data from a first payment device via a first protocol through a first of the interfaces for the conduct of a first transaction, the first transaction data being in a particular format, extract first payment data from the first transaction data, and forward the first payment data for approval of the first transaction. The instructions further cause the POS terminal to receive second transaction data from a second payment device via a second protocol through a second of the interfaces for the conduct of a second transaction, the second transaction data being in the same particular format, extract second payment data from the second transaction data, and forward the second payment data for approval of the second transaction. In some embodiments, the at least two interfaces include a near field communications (NFC) wireless communications interface. In some embodiments, the at least two interfaces include a near field communications peer-to-peer (NFCP2P) wireless communications interface. In some embodiments, the at least two interfaces include a QR code reader. In some embodiments, the at least two interfaces include a chip card reader. In some embodiments, the instructions, when executed by POS terminal processor, further cause the POS terminal to receive value added service (VAS) information from at least one of the first and second payment devices, the VAS information being in an extensible tagged format; and forward at least some of the VAS information to a different destination than a destination to which the first or second payment data was forwarded.

According to another aspect, a payment device comprises a processor, an interface for transmitting data electronically, and memory. The memory holds payment data, a randomly generated limited device key, and processor instructions. The instructions, when executed by the processor, cause the payment device to transmit the payment data to a reader during the conduct of a transaction at a point of sale, compare a limitation of the limited device key with a criterion, and when the criterion is met, request a new randomly generated limited device key from an external source. In some embodiments, the limited device key is valid for only a limited time, and the criterion includes a threshold time after which the payment device can request a new randomly generated limited device key. In some embodiments, the limited device key is valid for only a limited number of transactions, and the criterion is a threshold number of transactions after which the payment device can request a new randomly generated limited device key. In some embodiments, the limited device key is valid for only a limited time and for a limited number of transactions, and the criterion includes a threshold time after which the payment device can request a new randomly generated limited device key and also includes a threshold number of transactions after which the payment device can request a new randomly generated limited device key. In some embodiments, the instructions, when executed by the processor, further cause the payment device to include the randomly generated limited device key in the payment data. In some embodiments, the instructions, when executed by the processor, further cause the payment device to transmit a sequence value with the payment data, the sequence value being usable by an external system to identify the randomly generated limited device key being used by the payment device. In some embodiments, the interface is near field communications (NFC) wireless communications interface. In some embodiments, the interface is a near field communications peer-to-peer (NFCP2P) wireless communications interface. In some embodiments, the payment device comprises and electronic display, and the interface includes a capability for displaying a QR code on the electronic display. In some embodiments, the instructions, when executed by the processor, further cause the payment device to perform host card emulation.

According to another aspect, a payment device comprises a processor, at least first and second interfaces for transmitting data electronically, the first and second interfaces being of different types, and memory. The memory holds payment data and also holds processor instructions that, when executed by the processor, cause the payment device to transmit the payment data to a first reader in a particular format using the first interface during the conduct of a first transaction at a first point of sale, and transmit the payment data to a second reader in the same particular format using the second interface during the conduct of a second transaction at a second point of sale. In some embodiments, the payment data includes Track 1 data and Track 2 data, and wherein data items necessary for transaction approval are included in both the Track 1 data and the Track 2 data. In some embodiments, the payment device further comprises a secure element in which the payment data is stored. In some embodiments, the payment device performs host card emulation.

BRIEF DESCRIPTION OF THE DRAWINGS

FIG. 4 illustrates a user interface in accordance with an example embodiment of the invention.

FIG. 5A shows a simplified example representative of a tagged data format, in accordance with embodiments of the invention.

FIG. 5B shows an example of transaction data, in accordance with embodiments of the invention.

FIG. 8 illustrates an example layout of Track 1 data transmitted by a device having a secure element, in accordance with embodiments of the invention.

FIG. 9 illustrates an example layout of Track 2 data transmitted by a device having a secure element, in accordance with embodiments of the invention.

FIG. 10 illustrates an example layout of Track 1 data transmitted by a device using host card emulation, in accordance with embodiments of the invention.

FIG. 11 illustrates an example layout of Track 2 data transmitted by a device using host card emulation, in accordance with embodiments of the invention.

DETAILED DESCRIPTION OF THE INVENTION

Figure 1:
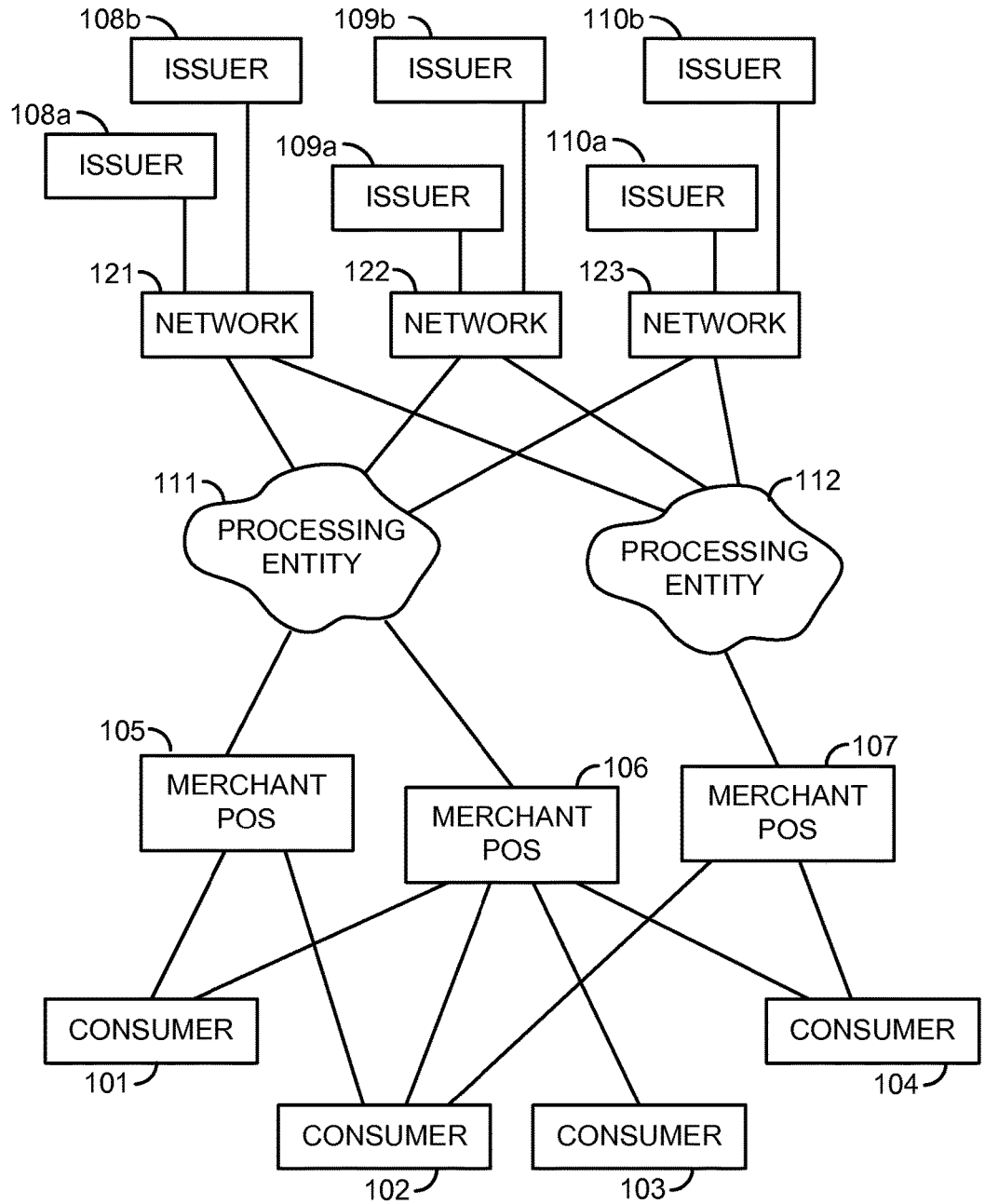
FIG. 1 illustrates a simplified diagram of a portion of a financial infrastructure.

FIG. 1 illustrates a simplified diagram of a portion of a financial infrastructure. In this example, each of consumers 101-104 may wish to make purchases at merchants 105-107 using presentation instruments such as credit cards and debit cards issued by issuers 108a-110b. The diagram of FIG. 1 is simplified, in that in practice there may be many thousands of card issuers, millions of merchants, and hundreds of millions or even billions of consumers in the marketplace. Each merchant 105-107 wishes to accept a wide variety of cards, in order to accommodate many different consumers. But given the large numbers of merchants and issuers, it is impractical for each merchant to establish a working relationship with each issuer and to maintain equipment to interact with each issuer individually. To simplify the process of accepting presentation instruments, most merchants establish a relationship with a processing entity such as entity 111 or 112.

Each consumer has a pre-existing relationship with the issuer of the payment instrument being used, typically a bank. The bank may extend credit to the consumer, against which the consumer makes purchases with a credit card. In this case, the consumer periodically pays the bank for the purchases, often with funds drawn on a different bank (not shown). Or the issuer bank may hold funds in a debit account and the consumer may make purchases using funds in the account using a debit card.

During a typical purchase transaction, the merchant "swipes" a consumer's card into a payment terminal, also sometimes called a point of sale device or POS device. The payment terminal contacts a processing entity such as processing entity 111, and sends a transaction approval request message that includes the consumer's card number and the amount of the proposed purchase, among other information items. The processing entity determines, based on the card number, which "network" 121, 122, 123 the card is affiliated with, and forwards the approval request to the appropriate network. In this context, a "network" describes a company and an affiliated group of issuers that offer payment instruments branded as affiliated with the network, along with the necessary agreements and hardware infrastructure for administering the network. Examples of networks include the Visa™, MasterCard™, and American Express™ networks and others used mainly in credit card transactions, and NYCE®, Star®, and others used mainly in debit transactions. The network determines which of its affiliated issuers holds the account the consumer wishes to use for payment, and forwards the approval request to the appropriate issuer, for example issuer 108a. The issuer determines whether the consumer has enough available credit (or enough funds on deposit for a debit transaction), and if so, sends an approval message back to the network, which forwards it to the processing entity, which then forwards the approval message to the payment terminal.

For many credit card transactions, the consumer is asked to sign a document at the time of purchase, as a way of authenticating the consumer as the rightful account holder and not someone attempting to make a fraudulent purchase. A typical debit card transaction proceeds a way similar to a credit card transaction. Often for debit cards, authentication of the consumer is done by way of a personal identification number (PIN) entered by the consumer, rather than using a signature.

More detail about payments networks and payment transactions may be found in pending U.S. patent application Ser. No. 11/055,028 of Rogers et al. filed Feb. 9, 2005 and titled "Methods and systems of processing transactions", the entire disclosure of which is incorporated by reference herein.

Figure 2:
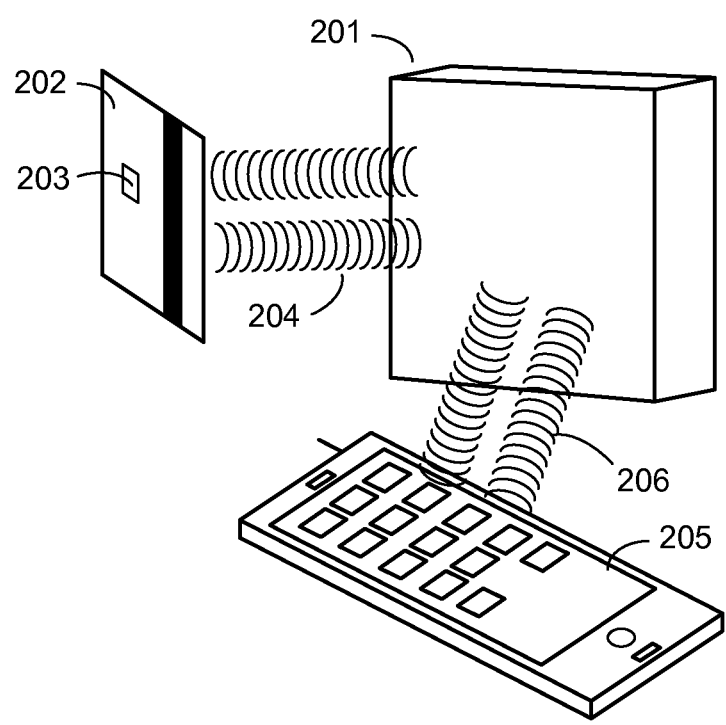
FIG. 2 illustrates the operation of a contactless reader, in accordance with embodiments of the invention.

The introduction of credit and debit cards and EFT networks has greatly improved the efficiency of payments handling, and other improvements to the basic processes described above have also occurred. For example, "contactless" payment systems eliminate the need to "swipe" a card, or even the need for a physical credit or debit card. As is shown in FIG. 2, a wireless reader 201 which is part of a point-of-sale device may read properly-equipped cards such as card 202 when card 202 is simply placed in close enough proximity to reader 201. Information similar to the information stored on the card's magnetic stripe may also be stored on a chip 203 within card 202, and can be transmitted wirelessly 204 from card 202 to reader 201, for example using near field communications (NFC) or similar technology. (Although two payment devices are shown in FIG. 2, typically only one payment device at a time would be presented to reader 201.) The action of holding the card or other device close enough to reader 201 to transfer information may be called a "tap", even though physical contact between the two may not be necessary.

Historically, many magnetic-stripe cards have included multiple data tracks encoded somewhat differently. Two tracks are common, and are called Track One and Track Two. While the card number is typically included in both tracks, some other data may differ between the tracks.

It is not necessary that the card account information even be stored on a physical card. For example, it is now possible to store the credit card information on a portable electronic device such as a cellular telephone 205, and to make purchase transactions by simply holding the telephone near reader 201. The account information is transmitted wirelessly 206 to reader 201, as if the information has been read from a physical credit card. (For historical reasons, the data may be designated Track One data or Track Two data, even though no magnetic tracks are involved.) The wireless data exchange between telephone 205 and reader 201 typically takes place over a short range wireless link such as an NFC link. For the purposes of this disclosure, a "short range" wireless link is one that does not provide wide area communication capability, but is limited to direct communication with devices in relatively close physical proximity, for example up to a few inches for some short range interfaces or up to a few hundred feet for other short range interfaces. Examples of short range wireless link implementations include NFC, RFID, Bluetooth™, WiFi™ wireless communication systems. An example of a wireless communication link that is not considered short range is the cellular radio transceiver within a cellular telephone.

Some consumers may find it convenient to use a mobile device such as a cellular telephone as a payment device, as many consumers constantly carry their cellular telephones and use them for a variety of purposes other than telephone calls. Preferably, cellular telephone 205 is a "smart" phone having a processing system and sophisticated display, so that additional capabilities can be installed on the telephone 205 in the form of software applications (often called "apps"). The card information may be stored in a special memory location on the contactless device having very limited access privileges to thwart theft of the information. This location may be called a "secure element" in some cases, for example in some devices equipped with NFC capability.

Because of the close analogy to physical cards, the terms "card account" and "card information" and the like may sometimes be used to refer to accounts and information that are processed entirely electronically, without a physical card being present.

In other devices, for example some smart telephones, the data is stored in the telephone's memory and the operation of a card is emulated in software, in a technique called "host card emulation" (HCE). Many security measures may be provided to guard against illicit copying or use of account information. For example, U.S. Patent Application Publication 2010/0185545 of Royyuru et al., titled "Dynamic Primary Account Number (PAN) and Unique Key Per Card" and published Jul. 22, 2010, is incorporated by reference herein in its entirety, and discloses methods for providing encrypted dynamic account numbers.

In addition to the simple credit and debit card accounts described above, may other forms of similar presentation instruments have been developed. For example, many merchants now offer store-branded credit cards that may carry special features. Purchases made at the sponsoring merchant using the store-branded card may accumulate reward points that can be redeemed by the cardholder for future discounts, free merchandise, or the like. Such store-branded cards may also be known as private label credit cards (PLCC).

Another kind of presentation instrument is the stored value card, for example a gift card offered by many merchants. When such a card is purchased, the purchase price is held by the merchant, and the card user (who often has received the card as a gift) can present the card at the merchant to make payment for goods or services. The cost of each purchase is deducted from the stored balance until the balance is depleted. With some gift or other stored value accounts, the stored balance can be replenished.

Some cards may have the capability to act as either credit or debit cards, and may have two or more sets of stored information. That is, transactions conducted with the card may be processed over credit authorization processing "rails" or over debit authorization processing "rails", even though the same debit account is accessed in either case. Each merchant may have a preference as to which type of processing to use in a particular transaction. In prior systems, a second "tap" of the contactless device may have been needed to change from the issuer's default transaction type. For example, see U.S. Pat. No. 8,523,053 to Royyuru et al, titled "Enabling Consumer Choice on Contactless Transactions When Using a Dual-Branded Payment Instrument" and issued Sep. 3, 2013, the entire disclosure of which is incorporated by reference herein.

In general, processing of store-branded and pre-paid gift cards is less standardized than the processing of generic credit and debit cards, in part because different issuers have adopted different data and communication formats. Embodiments of the invention may provide enhanced standardization and processing flexibility, especially for store-branded and pre-paid accounts, although the invention is not limited to these kinds of accounts.

Figure 3:
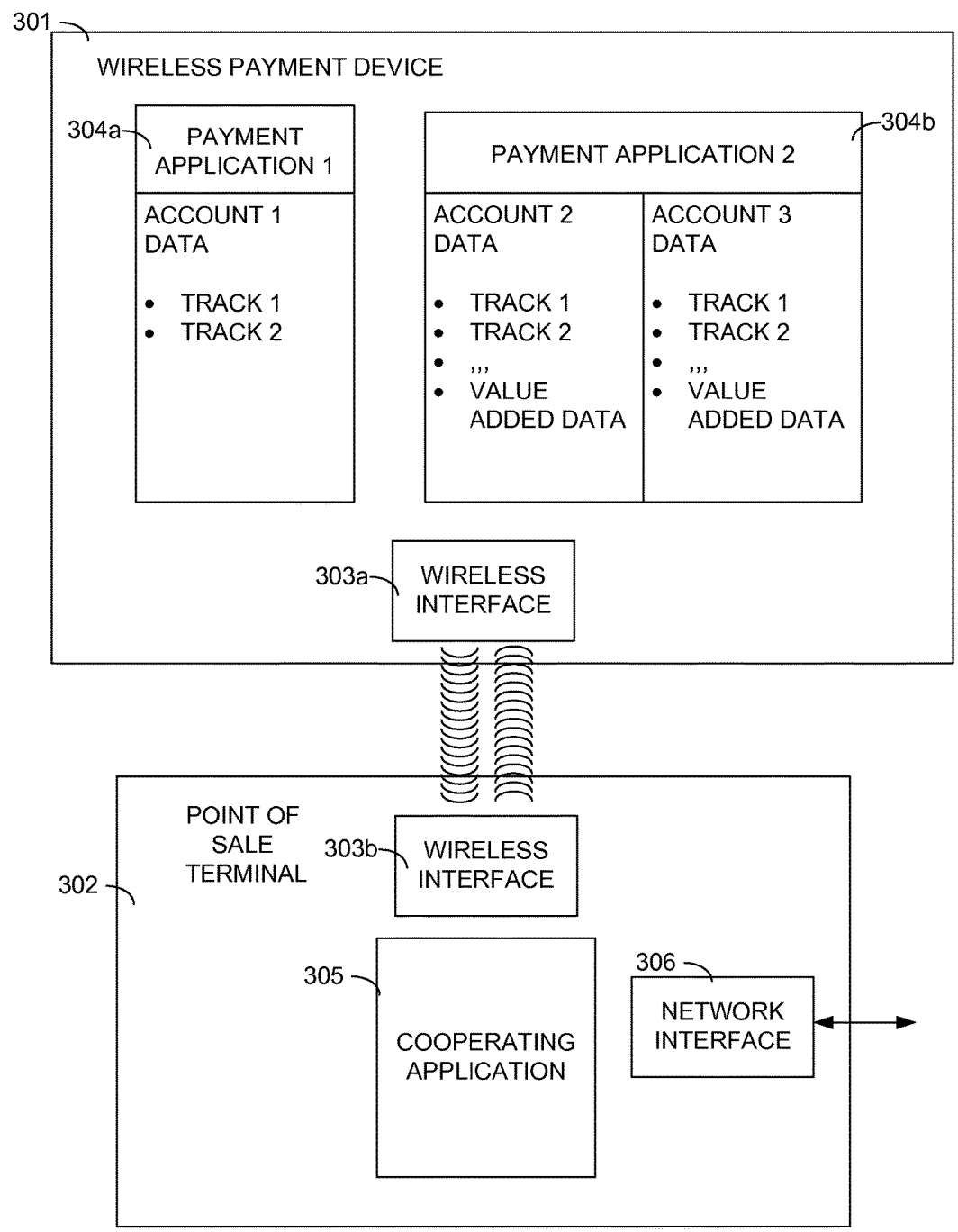
FIG. 3 schematically illustrates a wireless payment device and a POS terminal in accordance with embodiments of the invention.

FIG. 3 illustrates a wireless payment device 301 and a POS terminal 302 in accordance with embodiments of the invention. POS terminal 302 may be, for example, a smart phone such as phone 205 shown in FIG. 2. Payment device 301 and POS terminal 302 can communicate via wireless interfaces 303a and 303b, which may be NFC interfaces, radio frequency identification (RFID) interfaces, or another kind of wireless interface. For example, embodiments of the invention may be practiced using devices that communicate via the Bluetooth™ wireless communication standard, the WiFi™ wireless communication standard, or another kind of wireless communication protocol. The invention may also be embodied in systems and transactions that do not involve a POS terminal at all, for example transactions conducted via the Internet.

Wireless payment device 301 and POS terminal 302 are cooperatively programmed. For example, wireless payment device 301 may include one or more payment applications 304a, 304b. A payment "application" includes programming and associated data that operate to make payments using a particular account or accounts. A particular payment application may be provided by the issuer of the associated account, or by a merchant. For example, payment application 304a may correspond to a particular credit account, with corresponding Track 1 and Track 2 data storing the credit account number. Similarly, payment application 304b may correspond to a store-branded multi-function card, with the corresponding account number stored in the Track 1 and Track 2 data. In addition, value added data may be present. Value added data may include information beyond what would have been stored on a traditional card, such as store loyalty account information and the like.

POS device 302 includes programming 305 that cooperates with payment applications such as applications 304a and 304b on payment device 301. This cooperative programming defines how the two devices communicate to carry out traditional simple transactions, and to implement enhanced transaction capabilities in accordance with embodiments of the invention, when possible.

POS terminal 302 also includes a network interface 306, for communicating with other entities such as processing entities 111 and 112.

In accordance with a first embodiment, at the time of personalizing a payment application such as payment application 304b to work with a particular account, the issuer can set an option flag or field in the account data, indicating whether the application should simply emulate a traditional card for the particular account, or will implement enhanced capabilities that may be provided by embodiments of the invention. The option flag or field may be selected on the basis of the capabilities of the device onto which the payment application is being installed, and thus may be called a device capability option. For example, if a simple device is being personalized, the field may be set to indicate that the payment device will simply emulate a traditional card. However, if a smart phone or other device with computational capability is being personalized, this field may be set to indicate that enhanced features are to be enabled. For example, embodiments of the invention may encode the account number into a dynamic transaction cryptogram (DTC) for transmission to the issuer for transaction approval. The DTC changes for each transaction, and therefore protects against "replay" fraud, in which a party may try to record interactions between payment device 301 and POS terminal 302 and conduct fraudulent transactions by replaying the data sent by payment device 301 in a previous transaction. The use of a DTC is explained in more detail in U.S. Patent Application Publication 2010/0185545 of Royyuru et al., previously incorporated by reference. Different accounts on the same device may have different device capability option settings. For the purposes of this disclosure, for a device to have a "computational capability" means that the device can store and alter data in a memory, can perform arithmetic, and can apply logic to select operations to perform.

According to some embodiments, an issuer can specify at the time of personalization whether a mobile personal identification number (mPIN) is required to perform transactions on the account being personalized to the device. This specification may also be stored as a flag or field in the data associated with the account being personalized to the device. If no mPIN is required, then possession of the mobile payment device alone will be sufficient to perform transactions. If an mPIN is required, the consumer will be required to enter the mPIN, typically a 4-digit number, during each transaction in order to proceed. The entered number (the transaction value) is sent to the issuer who compares it with the correct mPIN value on record (the stored value). If the two match, the issuer has confidence that the person attempting the transaction is authorized to perform transactions on the account. If the two differ, the consumer may be offered the chance to re-enter the mPIN, or the transaction may be denied. In some embodiments, the choice of whether to require an mPIN may be offered to the consumer at the time of personalization. For example, during personalization, the payment application may ask the consumer if he or she would like an mPIN to be required even though the issuer may not consider it necessary.

According to some embodiments, the transaction mPIN value entered by the consumer is hashed into the DTC before the DTC is sent to the issuer for transaction approval. In prior systems, the mPIN was sent separately from the account number. Combining the transaction mPIN value with the account number in this way adds security to the transmitted mPIN, as it is more difficult to isolate from the data stream. As will be recognized, the device capability flag described above may need to be set to require a DTC, in order for the mPIN hashing to occur.

In some embodiments, additional information beyond the conventional Track 1 and Track 2 data may be included in the information sent from a payment device such as payment device 301 to a POS device such as POS device 302. This kind of information may be related to value-added services (VAS) offered in conjunction with a particular account. For example, when a consumer uses a particular store-branded account, the consumer's store loyalty account number may be stored in the application data, and included in the transaction data sent to POS terminal 301. POS terminal 301 may be part of a merchant system that can separate merchant-specific information (such as a loyalty membership number) from issuer-required information (such as the account number and mPIN if required). The issuer-required information can be sent to the issuer for transaction approval, while the merchant-specific information can be used in any way the merchant sees fit.

A payment application such as application 304*b* may enable the consumer to "re-personalize" the VAS data. (The consumer would not be permitted to change some account data, for example the account number.) For example, payment application 304*b* may present the user with an interface as shown in FIG. 4. While a loyalty number and an email address are given as examples of VAS data in FIG. 4, the invention is not so limited. Other or different VAS information may be collected and used.

Preferably, transaction data sent from payment device 301 to POS terminal 302 is in a "tagged" format. That is, each data field is presented in a name/value pair. Thus, the transaction data content is extensible. New fields can be labeled with new tags. Up-to-date merchant systems may implement features using the new data, while legacy merchant systems can simply ignore unrecognized tags or tags relating to unimplemented features. FIG. 5A shows a simplified example representation of a tagged data format. Preferably, a merchant system can parse the transaction data, recognize data fields by their tags, and handle the various values accordingly. For example, transaction data such as the account number, purchase amount, merchant name, and the like may be forwarded to the issuer for approval. Loyalty program information may be used by the merchant system. Some optional data, for example the geographical location of the POS terminal (for example as determined by a global positioning system (GPS) receiver in the payment device) may be sent to the issuer for fraud protection. Many combinations are possible.

Tag data may be categorized into "before-transaction", "during-transaction", and "after-transaction" data. For example, before-transaction data could include an indication that the consumer has accumulated loyalty points or credit that he or she would like to apply to the current purchase. During-transaction data could include the track data and other information required by the issuer for transaction approval, the geographical location of the payment device at the time of the transaction, and the like. After-transaction data may include warranty registration information, the consumer's email address for sending electronic receipts, and the like.

According to some embodiments, a merchant can specify a preferred order in which payment processing options may be selected for a particular transaction. This capability may be especially relevant to dual-capability or dual-branded accounts, for example accounts for which transactions can be processed as either credit or debit transactions. In prior systems, the issuer specified the order in which the processing options would be chosen. For example, the issuer may have specified that all transactions on the account should be processed as credit transactions if the payment device and POS terminal support credit transactions, and that transactions should be processed as debit transactions only if no other option exists. However, particular merchants may have different preferences, for example to take advantage of lower-cost transaction processing arrangements. In prior systems, the merchant had no ability to change the specified order of payment options. Prior payment applications and POS terminals did not provide a mechanism for giving the merchant a choice in the matter. During each transaction, the POS terminal could read data from only one payment application per presentation of the payment device.

In embodiments of the invention, a merchant can set a preferred application list (PAL). The payment device and POS terminal are programmed to transmit and receive multiple payment application identifiers (AID) upon presentation of the payment device to the POS terminal. The different payment applications available on the payment device are compared with the merchant's PAL, and the first matching payment application can be used, according to the merchant's preference.

For example, a consumer may use a dual-branded account for which transactions may be processed either using the VISA™ network or using the STAR™ network when the account is used at a particular branded merchant. That is, different payment applications may be used on the payment device. The branded merchant would prefer that its own payment application be used on the payment device, because this may ensure that the merchant receives loyalty information from the consumer, and that the transaction can be processed using the merchant's preferred network. However, if the same account is used to make a purchase at some other merchant (other than the merchant branded on the card), the other merchant will not be able to use the store-specific loyalty information or the like, and may prefer to process the transaction as a generic credit card transaction. The second merchant's PAL will not include the first merchant's branded payment application, and therefore that application will not be selected for use at the second merchant, because it will not match any application in the second merchant's PAL.

According to some embodiments, two payment applications may be used within a single transaction. For example, in conjunction with transmitting data to the POS terminal using a first payment transaction, the payment device may signal that it has additional data to send, for example loyalty or location information that was not includable in the data transmission from the preferred application used to transmit the account information. For this purpose, the POS system may maintain a secondary application list (SAL), having a prioritized list of applications that may be used for a secondary transmission from the payment device to the POS terminal. Upon receipt of the indication that the payment device wishes to send more information, the POS terminal can compare the applications available on the payment device with the SAL, and transmit a second read signal to the payment device requesting data using the available payment application having the highest priority in the SAL. In one scenario, the account data received from the first payment application is used for transaction approval, while the additional data received from the second payment application is used for merchant-specific purposes. In another scenario, the first payment application is used for conveying merchant-specific non-payment data and data received from the second payment application is used for transaction approval.

This ability to use multiple payment applications on a payment device may have the advantage that loyalty information can be included in a generic transaction if desired.

According to some embodiments, a payment application may report the all data elements necessary for transaction approval in both the Track 1 and Track 2 data fields. This feature may be especially useful in the processing of store-branded or private label accounts and gift accounts, for which there may be less standardization of data formats among different account issuers. Presenting the same data in the Track 1 and Track 2 data fields allows downstream entities to choose either and to obtain all of the necessary data to process a transaction, without the payment device or POS terminal having to "know" the preference of the downstream entity.

According to some embodiments, transaction data (Track 1 data, Track 2 data, VAS data) is communicated by the payment device in the same format regardless of how data is stored on the payment device or what transmission protocol or interface is being used. For example, some devices may store account number information in a secure element (SE), while other devices may use host card emulation (HCE). Some devices and readers may communicate via an NFC interface, and NFC P2P interface, a QR Token, or other means.

Figure 5C:
FIG. 5C shows another example of transaction data, in accordance with embodiments of the invention.

For example, FIGS. 5B and 5C illustrate two examples of transaction data in accordance with embodiments of the invention. In both figures, the transaction data is shown as XML code for ease of explanation, but any suitable coding could be used, either human readable or non-human readable. For example, the data could be a sequence of hexadecimal digits.

The transaction data of FIG. 5B may be sent, for example, by a device using an NFC P2P interface. As can be seen, the Track 1 and Track 2 data are tagged with tags numbered 56 and 57 (although these designations are arbitrary). The transaction data of FIG. 5C may be sent, for example, in a QR code such as QR code 501. As can be seen, the Track 2 data is again tagged with a tag numbered 57, and the value within tag 57 is identical to the value within tag 57 of FIG. 5B. Thus, a POS device wishing to extract the account number from the transaction data may look for tag 57, and extract the tag data, knowing that the account number will be the first digits of the data from tag 57. Regardless of how the sending payment device transmits the account number, the payment device places the account number into a tag formatted the same as if the data were transmitted by another interface and protocol. In this disclosure, an entire transmitted data set such as is shown in FIG. 5B or 5C may be referred to as "transaction data", and the information necessary for transaction approval, for example the account number and other Track 1 or Track 2 data elements, may be referred to as "payment data".

FIGS. 5B and 5C illustrate that the tag names need not be identical for devices using different transmission protocols, so long as the reading device can locate the desired tags. While the content of tag 57 is identical in FIGS. 5B and 5C, the tag names differ slightly. FIGS. 5B and 5C also illustrate the flexibility of a tagged data format. The transaction data in FIG. 5C does not even include Track 1 data.

Figure 6:
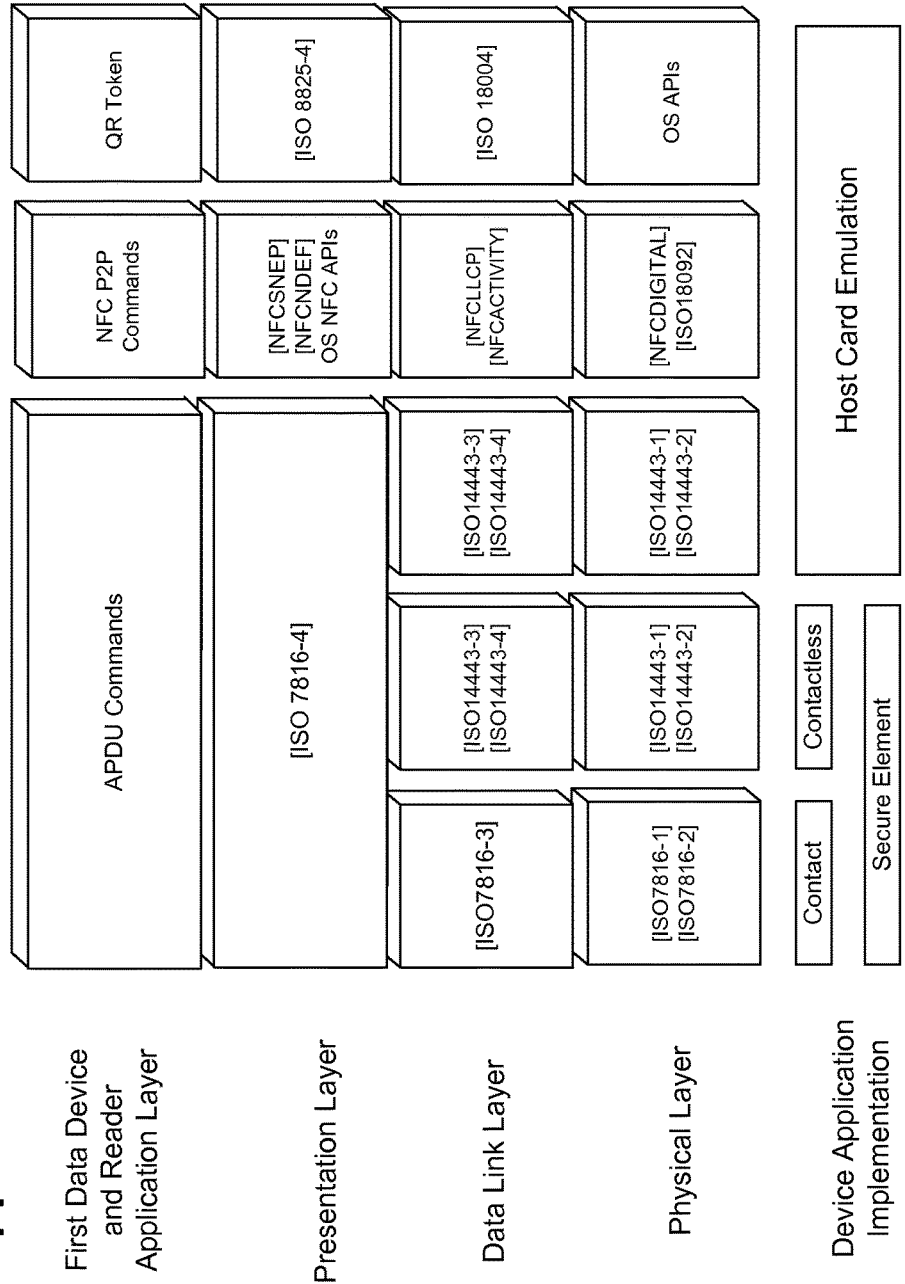
FIG. 6 illustrates a layered interface architecture, in accordance with embodiments of the invention.

Because transaction data is provided in a "layer" of the protocol being used, features embodying the invention are easily extensible to payment devices and POS terminals using other communication protocols, for example a Bluetooth™ or WiFi™ protocol. A software development kit (SDK) may be provided having code libraries useful in implementing embodiments of the invention, so that a developer of a new payment device/POS terminal combination need not be concerned with the details of the transaction data formatting and exchange and the like. A diagram of the layer structure is shown in FIG. 6.

In prior devices using secure elements (SE), each device may have a device unique key (DUK) used for digitally signing outgoing messages. The DUK is derived from device and/or transaction data using a master key. The recipient of a message signed with a DUK who knows the master key and the device or transaction data used to derive the DUK can re-derive the DUK and verify that the message was signed by the proper device, without keeping a large table of device keys.

Recognizing that devices that do not have secure elements (SE) may be inherently less secure because their memory may be at least theoretically more vulnerable to attack than an SE, embodiments of the invention may use a randomly-generated limited device key (LDK) for each account that has been personalized onto the device. Each LDK is provided by the issuer of the respective account or by an entity acting on behalf of the issuer, and is valid for only a limited time, a limited number of transactions, or both. Before expiration of an LDK, the device can request a new LDK, which will have a new expiration time and will permit additional transactions, up to a new transaction limit.

A service code within the data transmitted from the device to the reader may contain a service code indicating how the remaining data should be interpreted. For example, the service code may indicate whether the device uses a secure element (SE) and a DUK, or uses host card emulation (HCE) and an LDK.

When a new LDK is provided to the device, renewal threshold values may also be provided, specifying conditions under which the device can request a new LDK. For example, if an LDK is specified to expire in 72 hours or upon its use in three transactions, the renewal threshold values may specify that the device is eligible to request a new LDK after 48 hours or upon the completion of one transaction using the existing LDK. These values are only examples, and other thresholds may be used. So long as the device is able to contact the issuer to request a new LDK after the renewal threshold values are achieved but before expiration of the existing key, the user can continue to make purchases uninterrupted by the expiration of LDKs.

It will be recognized that because of the overlap between the renewal thresholds and the expiration limits of an LDK, a device may at times be in possession of more than one valid LDK. The device may choose which LDK to use. In order to avoid any confusion between the device and the issuer as to which LDK is being used, the device may also transmit with the transaction data a sequence ID in the Track 1 and Track 2 data, identifying the LDK being used.

Figure 7:
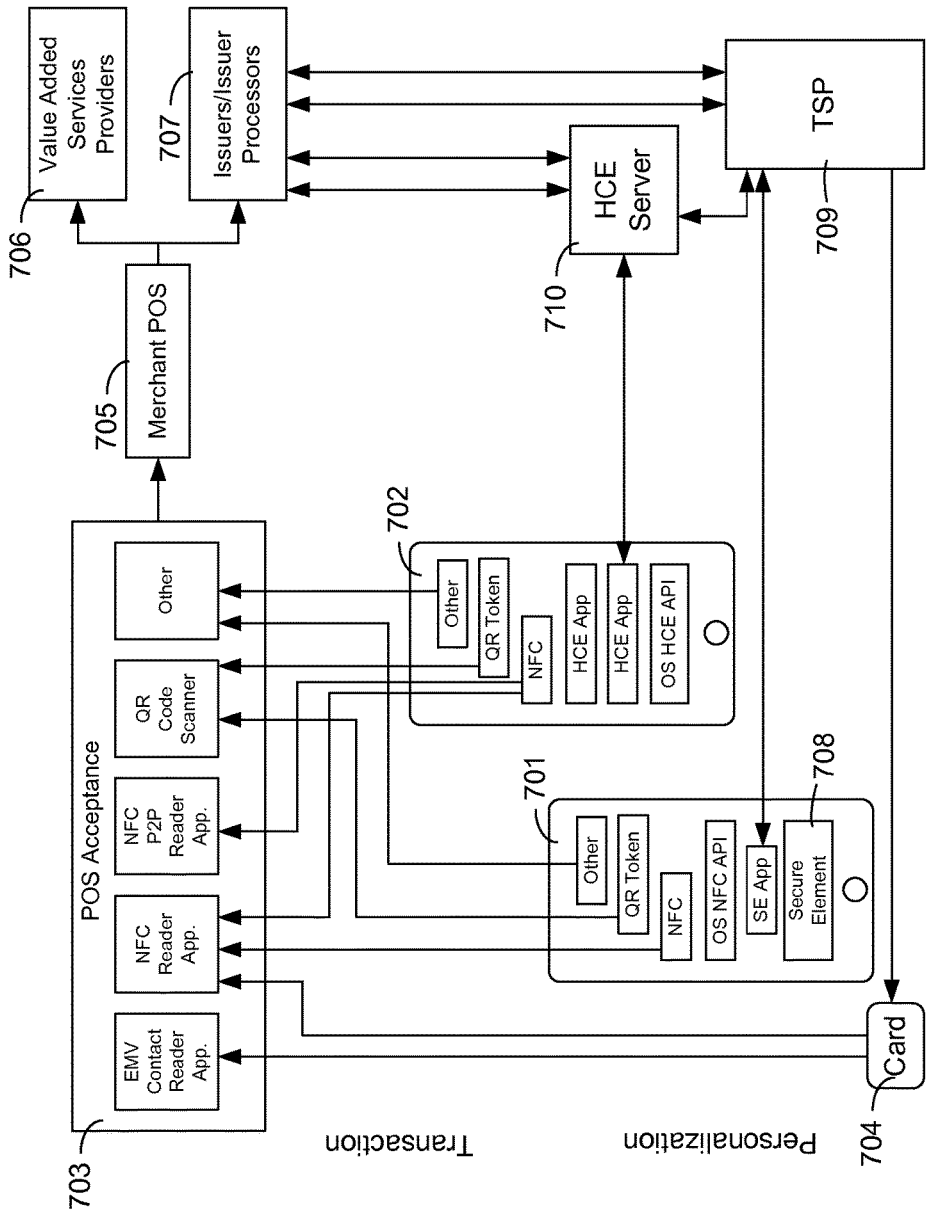
FIG. 7 schematically illustrates various devices and interactions that may be present in embodiments of the invention.

FIG. 7 schematically illustrates various devices and interactions that may be present in embodiments of the invention. Devices 701 and 702 are mobile devices, for example smart phones. Device 701 includes a secure element (SE) in which account data can be securely stored. Device 702 uses host card emulation (HCE). Each of devices 701 and 702 includes short range wireless capability, for example NFC, or a method for exchanging QR codes, for example a display on which a QR code can be displayed for reading by a camera or scanner. Other wireless communication techniques could be used. By whatever means, devices 701 and 702 can communicate wirelessly with a POS terminal 703. POS terminal 703 may also be able to read conventional magnetic stripe or contactless cards 604. POS terminal 703 is part of a merchant system 705 that may cooperate in the operation of embodiments of the invention. For example, when one of devices 701 or 702 provides transaction data according to embodiments, system 705 may parse the data and separate information required for issuer transaction approval and forward the information to issuer 706. Other information, for example loyalty information or other value-added service information may be forwarded to other service providers 707.

Still referring to FIG. 7, device 701 (including a secure element 708) may be "personalized" by storing account information in secure element 701. In some embodiments, rather than an actual account number, a token representing the account number may be stored. The token may be received from an issuer 707, or from an intermediary acting on behalf of the issuer, for example a token service provider 709.

During a transaction conducted with device 701, the account information or token is provided to POS terminal 703, and forwarded with other transaction data to issuer 707 for transaction approval. The information provided is preferably encrypted. If a token is used in place of an account number, issuer 707 may consult token service provider 709 to identify the account on which the transaction is being conducted. In addition, device 701 may provide a dynamic transaction cryptogram (DTC) unique to the particular transaction. The DTC may include a hash of the device unique key (DUK) stored in device 701. Issuer 707, or an entity acting on its behalf, can verify that the DTC was constructed with the correct DUK. In this way, it can be determined that device 701 has the correct DUK without the DUK being transmitted to POS terminal 703.

Once the account is identified and the transaction validated, the issuer can verify that the user of device 701 has sufficient credit or funds on deposit to cover the transaction, and can transmit approval of the transaction back to merchant system 705. Of course, if the user does not have sufficient credit or funds on deposit, the issuer may transmit a denial of the transaction.

In the case of device 702, which uses host card emulation (HCE), account information or a token representing the account information may be stored in memory on device 702. Such a token may be received from issuer 707 or another entity such as token service provider 709. In some embodiments, a limited device key (LDK) is also stored. The LDK may be provided by issuer 707 or another entity acting on behalf of issuer 707, for example token service provider 709. In the embodiment shown, HCE server 710 may manage the issuing and replacement of LDKs.

During a transaction, device 702 provides the stored account information or token (preferably in encrypted form) to POS terminal 703, which forwards the information to issuer 707 for transaction approval or denial as above. Device 702 may also provide a dynamic transaction cryptogram (DTC) unique to the transaction and derived using the LDK. Issuer 707 or an entity acting on its behalf can determine that the DTC was formed using the correct LDK, and therefore can determine that device 702 has the correct LDK even though the LDK itself is not transmitted. In some embodiments, issuer 707 may consult HCE server 710 to verify that the LDK is current and correct before approving a transaction.

When an LDK is about to expire, a new LDK is issued as is described above. Because device 702 may at some times be in possession of two valid LDKs, it may also provide a sequence number in the transaction data identifying which of its two valid LDKs is being used.

Still referring to FIG. 7, POS terminal 703 may implement certain other embodiments, for example the formatting of transaction data into the same particular format regardless of how data is stored on the payment device or what transmission protocol or interface is being used. For example, POS terminal 703 may accept account and other information from a variety of payment devices 701, 702, 704, and the like, which may provide account information in differing formats. In some embodiments, POS terminal 703 places the information into a standard format, for example the format depicted in FIG. 5. The merchant's computer system 705 may forward the information to value added service providers 706 and issuers 707 without requiring knowledge of the kind of payment device or protocol used to receive the information.

FIGS. 8 and 9 illustrate example layouts of Track 1 and Track 2 data transmitted by a device having a secure element, in accordance with embodiments of the invention. As can be seen, the data items necessary for transaction approval, including the primary account number (PAN) and expiration date of the account are present in both Track 1 and Track 2, so that downstream devices can choose to use either Track 1 or Track 2.

FIGS. 9 and 10 illustrate example layouts of Track 1 and Track 2 data transmitted by a device using host card emulation, in accordance with embodiments of the invention. As can be seen, the data items necessary for transaction approval, including the primary account number (PAN) and expiration date of the account again are present in both Track 1 and Track 2, so that downstream devices can choose to use either Track 1 or Track 2. Another feature apparent in FIGS. 9 and 10 is the presence of counters for managing limited device keys, and may be used with host card emulation as is discussed above.

While example embodiments are described above in the context of a consumer making a purchase at a POS terminal, for example at a merchant check-out counter, the invention is not so limited. Aspects of the invention may be embodied in other kinds of arrangements as well, for example in the processing of remote transactions that do not involve a POS terminal. One example of such an arrangement is in-store self-serve checkout by the customer using just his or her own payment device at any point in the store, without the customer having to proceed to a designated check-out counter or terminal. Other examples include on-line purchases performed outside a store environment, orders placed remotely with a merchant for later store pickup, and the like.

The invention has now been described in detail for the purposes of clarity and understanding. However, those skilled in the art will appreciate that certain changes and modifications may be practiced within the scope of the appended claims.

What is claimed is:

1. A payment device, comprising:
a processor;
an interface for transmitting data electronically; and
memory holding payment data, a randomly generated limited device key, and processor instructions that when executed by the processor cause the payment device to:
transmit the payment data to a reader during the conduct of a transaction at a point of sale, wherein at least some of the payment data is encrypted using the randomly generated limited device key;
compare a limitation of the limited device key with a criterion; and
when the criterion is met, request a new randomly generated limited device key from an external source;
wherein the memory holds two different valid limited device keys, and the instructions, when executed by the processor, further cause the payment device to transmit a sequence value with the payment data, the sequence value being usable by an external system to identify which of the two limited device keys is being used by the payment device in the transaction.

2. The payment device of claim 1, wherein the limited device key is valid for only a limited time, and the criterion includes a threshold time after which the payment device can request a new randomly generated limited device key.

3. The payment device of claim 1, wherein the limited device key is valid for only a limited number of transactions, and the criterion is a threshold number of transactions after which the payment device can request a new randomly generated limited device key.

4. The payment device of claim 1, wherein the limited device key is valid for only a limited time and for a limited number of transactions, and the criterion includes a threshold time after which the payment device can request a new randomly generated limited device key and also includes a threshold number of transactions after which the payment device can request a new randomly generated limited device key.

5. The payment device of claim 1, wherein the instructions, when executed by the processor, further cause the payment device to include the randomly generated limited device key in the payment data.

6. The payment device of claim 1, wherein the interface is near field communications (NFC) wireless communications interface.

7. The payment device of claim 1, wherein the interface is a near field communications peer-to-peer (NFCP2P) wireless communications interface.

8. The payment device of claim 1, wherein the payment device comprises and electronic display, and the interface includes a capability for displaying a QR code on the electronic display.

9. The payment device of claim 1, wherein the instructions, when executed by the processor, further cause the payment device to perform host card emulation.

* * * * *